O. JUNGGREN.
ELASTIC FLUID TURBINE.
APPLICATION FILED MAY 9, 1919.
1,326,869.
Patented Dec. 30, 1919.
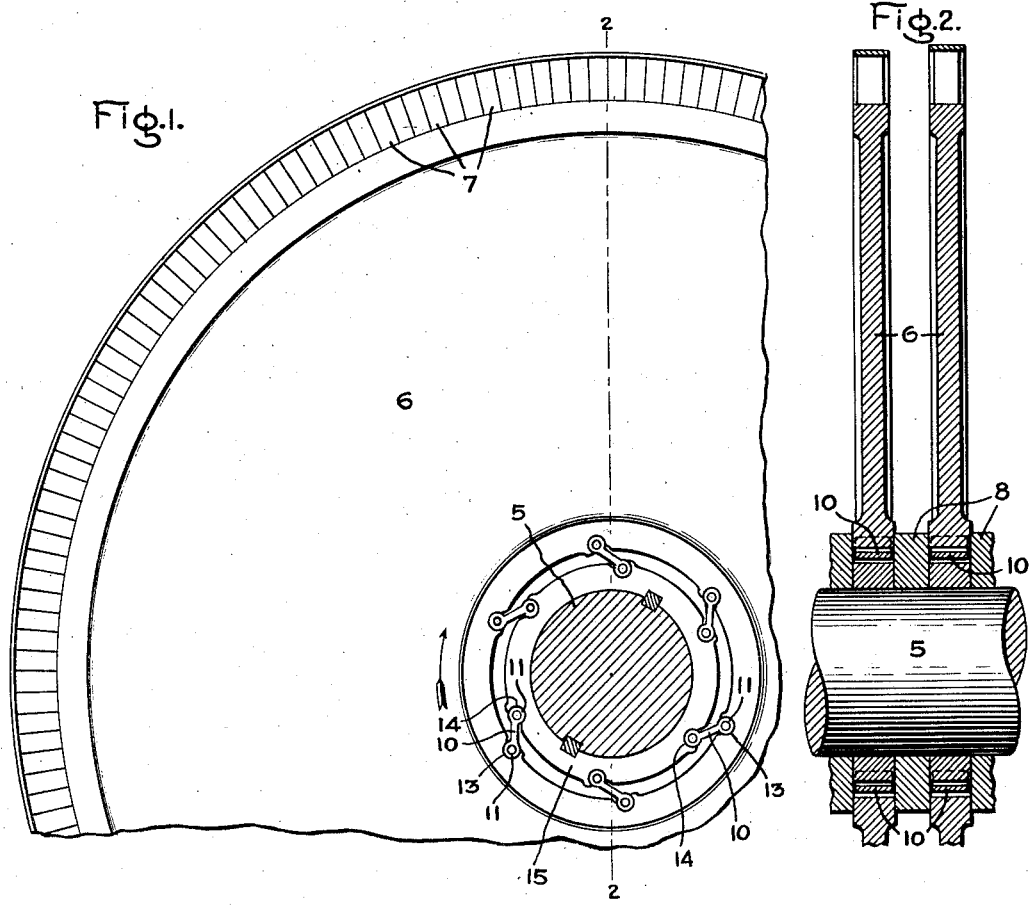
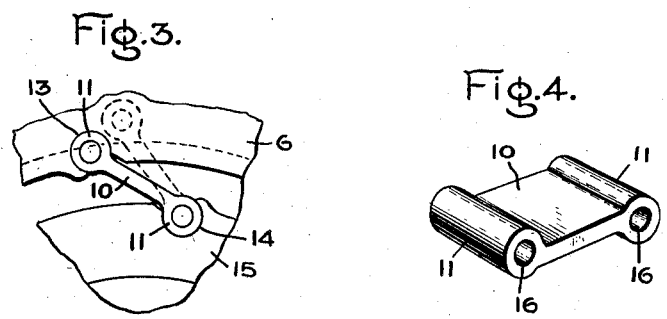
Inventor:
Oscar Junggren,
by Albert G. Davis
His Attorney.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

1,326,869.  Specification of Letters Patent.  Patented Dec. 30, 1919.

Application filed May 9, 1919. Serial No. 295,855.

*To all whom it may concern:*

Be it known that I, OSCAR JUNGGREN, a citizen of the United States, residing at Schenectady, in the county of Schenectady, State of New York, have invented certain new and useful Improvements in Elastic-Fluid Turbines, of which the following is a specification.

The present invention relates to elastic fluid turbines and particularly to turbines of the type comprising a plurality of disks or wheels mounted on a shaft and carrying suitable buckets upon the periphery. With such turbines it is important that the disks or wheels be made as light as possible in order to reduce the weight of the machine thereby reducing its size. In addition, by making the disks or wheels as thin as possible particularly at the hubs where the greatest stresses occur, the distance between the bearings may be reduced, or a larger number of stages may be put in in the same distance. On the other hand, it is essential to obtain a rigid construction which will withstand not only the stresses set up due to the centrifugal action, but also those which occur due to the substantial temperature changes which are continuously going on in the turbine due to changes in load and variations in the vacuum. If the turbine wheel or disk is rigidly fastened to the shaft, these latter stresses, due to temperature changes, are very large, particularly in the hubs, on account of the wheels or disks responding much more quickly to temperature changes than the heavy shaft, and with this arrangement a relatively heavy wheel having a strong hub is required as otherwise the wheel if made too thin and light will distort and possibly loosen on the shaft.

The primary object of the present invention is to provide an improved structure in which the wheel is flexibly or yieldingly connected to the shaft so it is free to respond to temperature changes independently of the shaft. By this arrangement the strains due to temperature changes are practically eliminated and as a consequence the wheels or disks may be made much lighter and thinner than heretofore.

For a consideration of what I believe to be novel and my invention, attention is directed to the accompanying specification and the claims appended thereto.

In the drawing, Figure 1 is a side elevation of a portion of a turbine wheel or disk embodying my invention; Fig. 2 is a section taken on line 2—2, Fig. 1; Fig. 3 is a detail view illustrating in an exaggerated manner the action which may take place under temperature changes; and Fig. 4 is a perspective view of a connecting link.

Referring to the drawing, 5 indicates a shaft and 6 wheels or disks mounted thereon and carrying the usual ring or rings of buckets 7. The wheels are spaced apart by rings 8 and it will be understood that between the wheels are the usual stationary nozzle diaphragms or intermediates for conveying elastic fluid from the buckets of one wheel to those of the next.

Now, according to my invention, I attach the wheel to the shaft by means of a series of flat links 10 having rounded heads 11 which are fixed in curved slots 13 and 14. Slots 13 are formed in the bore of the wheel and extend entirely across it and slots 14 are preferably made in a ring 15 which is of the same width as the wheel and is shrunk on the shaft and keyed thereto. Links 10 all lie within the plane of the wheel and extend in a direction other than radial, and they serve to transmit the torque from the wheel to the shaft. The direction of rotation is that indicated by the arrow in Fig. 1 and preferably links 10 extend from the wheel forward in the direction of rotation to the shaft. This means that when the turbine is running the links are under compression and are forced toward the bottom of slots 13 and 14. This obviates any likelihood of the links being pulled out of the slots.

With the foregoing arrangement it will be seen that in case of unequal heating, the wheel may expand radially relatively to the shaft and that when this occurs there will be a slight circumferential turning of the wheel relatively to the shaft the links pivoting in slots 13 and 14. This is illustrated in an exaggerated manner in Fig. 3 where a link 10 is shown in one position in full lines and a second position in dotted lines, the dotted line position illustrating a position which a link may assume after unequal expansion has occured. It will thus be seen that the links form a pivotal connection between the wheel and the shaft.

In manufacturing, the ring 15 may be first attached to the wheel by links 10,

Slots 13 and 14 are shaped so as to come up around heads 11 and encircle them sufficiently to prevent their coming out but at the same time permit of the desired pivotal movement. In assembling, the heads 11 may be inserted into slots 13 and 14 by driving them in endwise. Preferably the heads are made hollow by providing openings 16 through them and after the heads have been inserted in slots 13 and 14 a suitable tool may be driven through openings 16 to expand heads 11 to make them fit firmly into slots 13 and 14. After being attached to the wheel ring 15 is then shrunk on the shaft and keyed thereto. There is a ring 8 on each side of each wheel as shown in Fig. 2 and these are preferably made of sufficient radial thickness that they serve to hold the links 10 from axial displacement.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In combination, a shaft, a wheel having a bore of greater diameter than the shaft, and link members pivotally connecting the wheel to the shaft, said link members being located in the plane of the wheel and extending in a direction other than radial.

2. In combination, a shaft, a wheel having a bore of greater diameter than the shaft, and links located in a plane of the wheel which extend in a direction other than radial and are hinged at one end to the bore of the wheel and at the other end to the shaft.

3. In combination, a shaft, a wheel having a bore of greater diameter than the shaft, and links located in a plane of the wheel which extend in a direction other than radial and are hinged at one end to the bore of the wheel and at the other end to a ring shrunk on the shaft.

4. In combination, a shaft, a wheel having a bore of greater diameter than the shaft, and links which extend in a direction other than radial and are hinged at one end to the bore of the wheel and at the other end to the shaft, said link extending from the wheel forward in the direction of rotation to the shaft.

5. In combination, a shaft, a wheel having a bore of greater diameter than the shaft, a ring shrunk on the shaft, rounded grooves in said ring and wheel, and flat links having rounded heads which are located in said grooves and serve to pivotally connect the wheel to the shaft, said links being located in a plane of the wheel and extending in a direction other than radial.

6. In combination, a shaft, a wheel having a bore of greater diameter than the shaft, a ring shrunk on the shaft, rounded grooves in said ring and wheel, and flat links located in a plane of the wheel, said links having rounded heads which are located in said grooves and serve to pivotally connect the wheel to the shaft, said rounded heads being hollow whereby they may be expanded in the grooves by driving a tool through them.

7. In combination, a turbine wheel having a bore, a ring of lesser diameter than the bore and located therein, and links located in the space between the bore of the wheel and the ring, the ends of said links being pivotally connected to the wheel and to the ring.

8. In combination, a turbine wheel having a bore, a ring of lesser diameter than the bore and located therein, and links located in the space between the bore of the wheel and the ring, the ends of said links being provided with rounded ends pivotally mounted in the wheel and rings.

In witness whereof I have hereunto set my hand this 8th day of May, 1919.

OSCAR JUNGGREN.